United States Patent
Ishikawa et al.

(10) Patent No.: US 6,980,369 B2
(45) Date of Patent: Dec. 27, 2005

(54) ZOOM LENS

(75) Inventors: Yoichi Ishikawa, Zama (JP); Hotaka Takeuchi, Saitama (JP)

(73) Assignee: Nidec Copal Corporation, Tokyo (JP)

(*) Notice: Subject to any disclaimer, the term of this patent is extended or adjusted under 35 U.S.C. 154(b) by 101 days.

(21) Appl. No.: 10/794,477

(22) Filed: Mar. 5, 2004

(65) Prior Publication Data

US 2004/0179273 A1 Sep. 16, 2004

(30) Foreign Application Priority Data

Mar. 10, 2003 (JP) ........................ 2003-062782
Oct. 23, 2003 (JP) ........................ 2003-362684

(51) Int. Cl.$^7$ ............................ G02B 15/14
(52) U.S. Cl. ............... 359/680; 359/689; 359/676
(58) Field of Search ................. 359/676–692

(56) References Cited

U.S. PATENT DOCUMENTS

| | | | |
|---|---|---|---|
| 4,059,344 A | * 11/1977 | Yamasita | 359/783 |
| 5,648,835 A | 7/1997 | Uzawa | 396/429 |
| 6,069,648 A | 5/2000 | Suso et al. | 348/14.02 |
| 6,339,508 B1 | 1/2002 | Nozawa et al. | 359/686 |
| 2003/0179464 A1 | * 9/2003 | Amanai | 359/685 |
| 2003/0214726 A1 | * 11/2003 | Mihara | 359/676 |

FOREIGN PATENT DOCUMENTS

| | | | |
|---|---|---|---|
| JP | 06-107070 A1 | 4/1994 | |
| JP | 06-148518 A1 | 5/1994 | |
| JP | 09-211287 A1 | 8/1997 | |
| JP | 11-69214 A1 | 3/1999 | |
| JP | 2002-290523 A1 | 10/2002 | |

OTHER PUBLICATIONS

Patent Abstracts of Japan for JP06–107070 published on Apr. 19, 1994.
Patent Abstracts of Japan for JP06–148518 published on May 27, 1994.
Patent Abstracts of Japan for JP11–69214 published on Mar. 9, 1999.
Patent Abstracts of Japan for JP09–211287 published on Aug. 15, 1997.
Patent Abstracts of Japan for JP2002–290523 published on Oct. 4, 2002.

* cited by examiner

*Primary Examiner*—Georgia Epps
*Assistant Examiner*—M. Hasan
(74) *Attorney, Agent, or Firm*—Darby & Darby

(57) ABSTRACT

To obtain a small and thin zoom lens unit, the present invention includes a first lens group having a negative refractive power as a whole, a second lens group having a positive refractive power as a whole, and a third lens group having a positive refractive power as a whole, arranged from an object side to an image side. The zoom lens zooms from a short-focal end to a long-focal end and corrects image surface changes required in accordance with the zooming by means of moving the second lens group and the third lens group, wherein the first lens group includes a first lens having a negative refractive power and a prism having a negative refractive power and changing an incident light path, arranged from the object side to the image side, the second lens group including a single second lens, said third lens group including a single third lens.

15 Claims, 12 Drawing Sheets

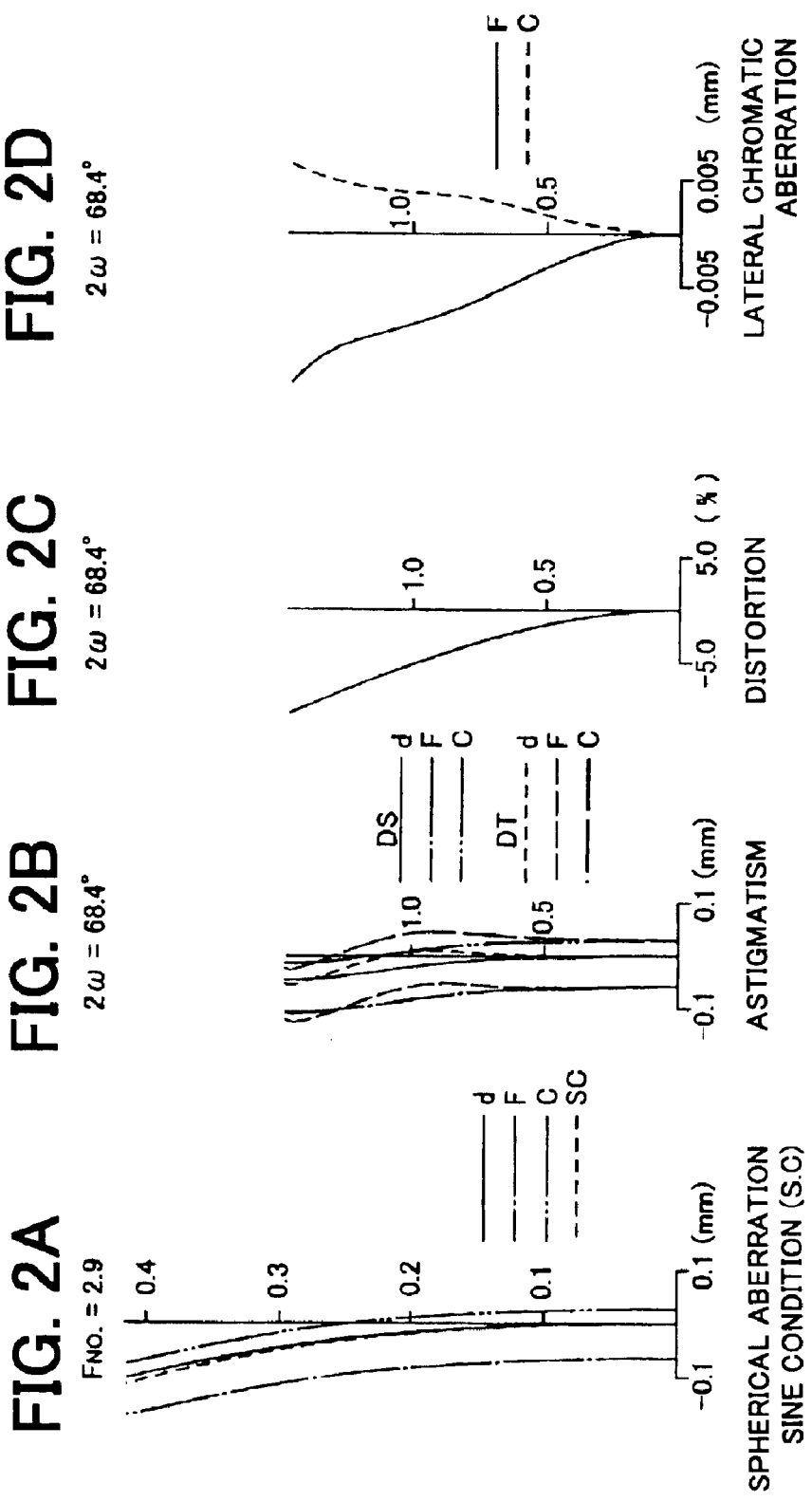

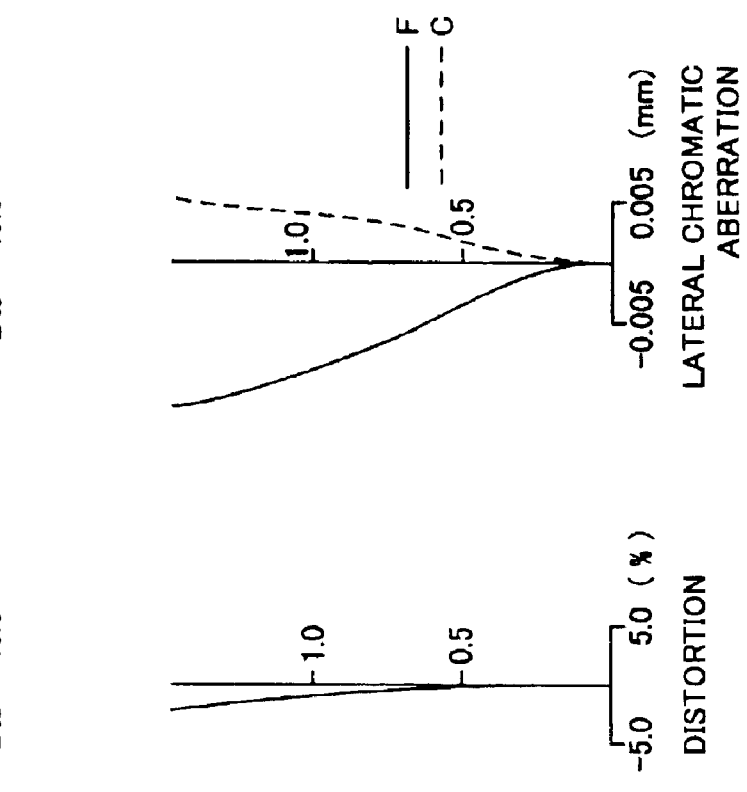

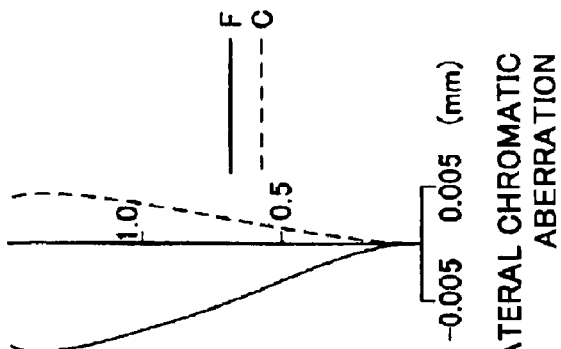
FIG. 4D 2ω = 35.1°
LATERAL CHROMATIC ABERRATION
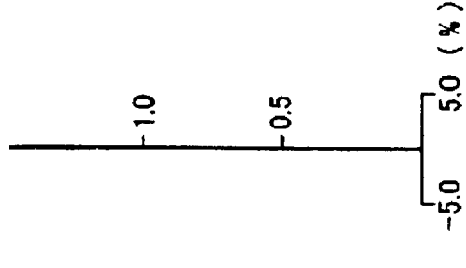
FIG. 4C 2ω = 35.1°
DISTORTION
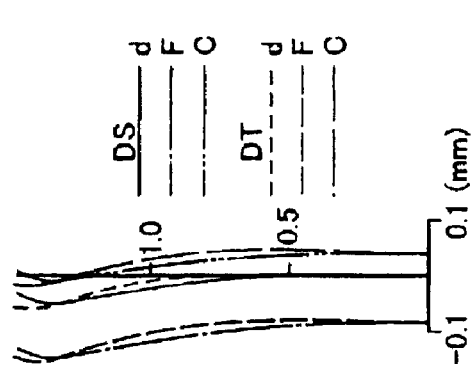
FIG. 4B 2ω = 35.1°
ASTIGMATISM
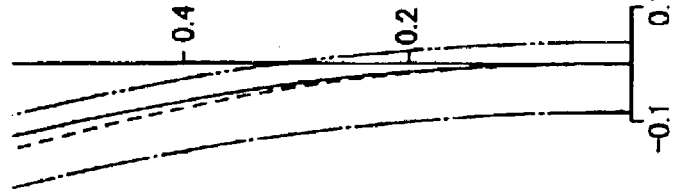
FIG. 4A F_{NO.} = 4.21
SPHERICAL ABERRATION SINE CONDITION (S.C)

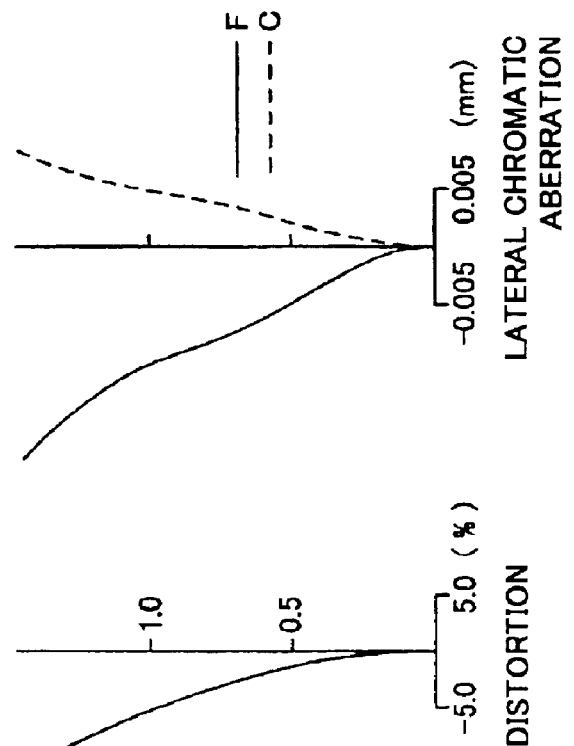

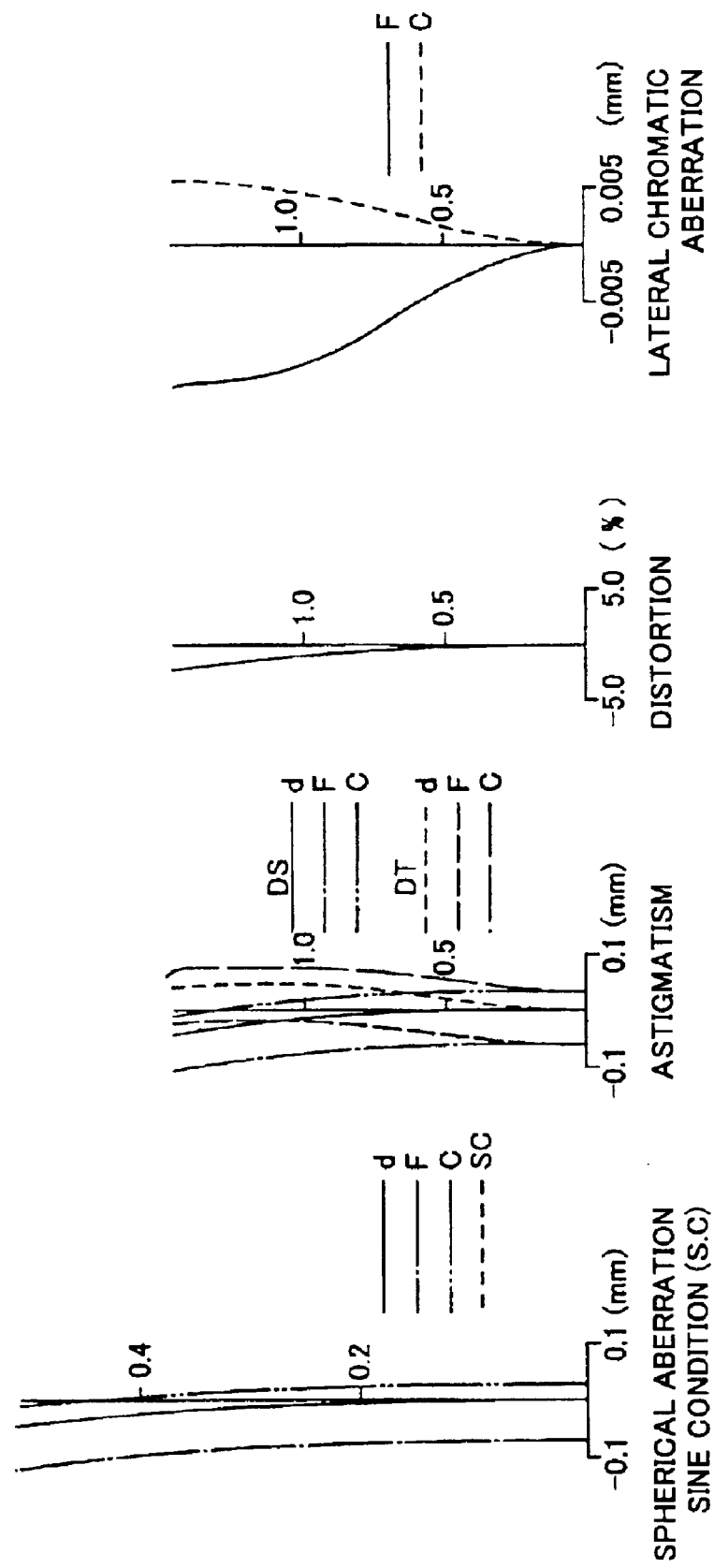

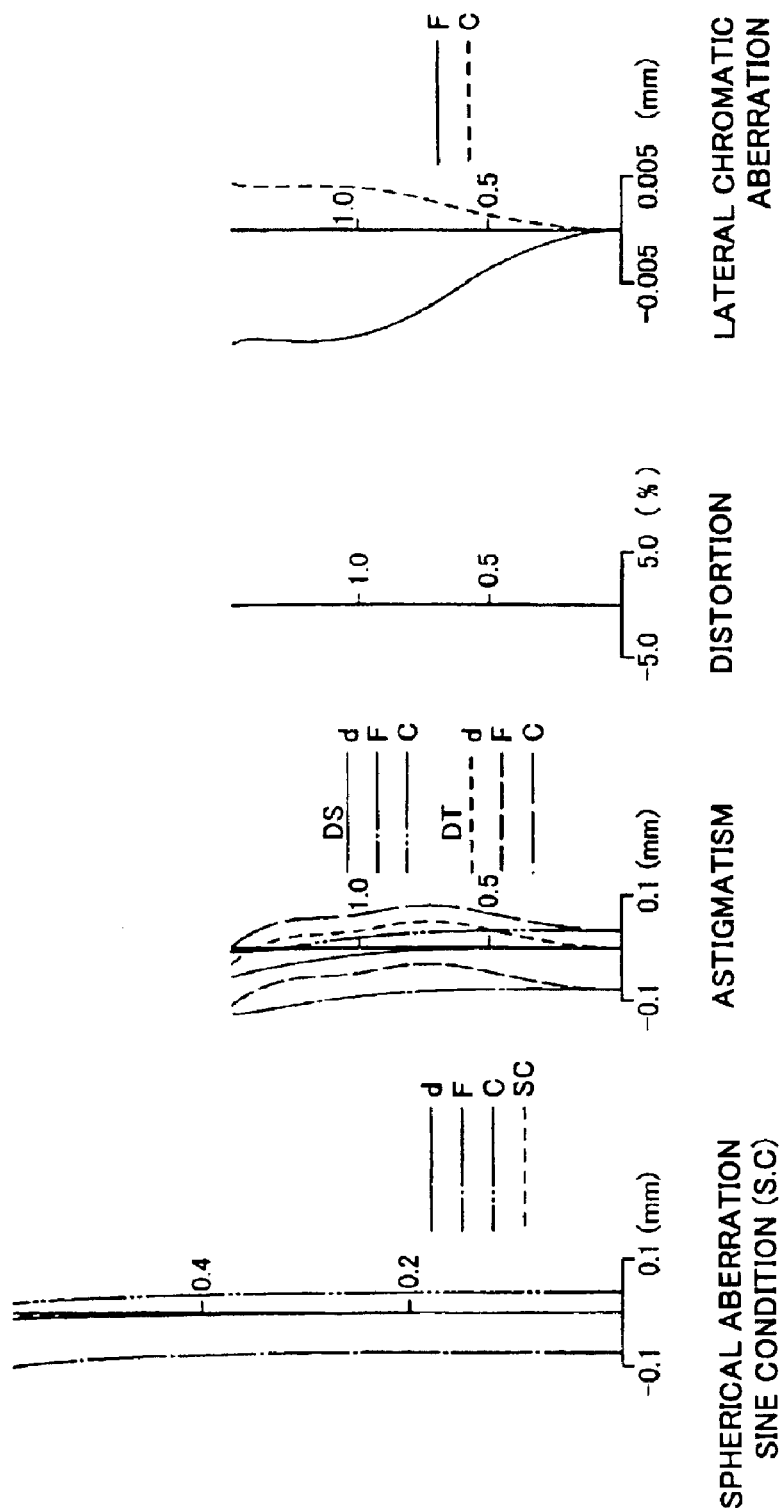

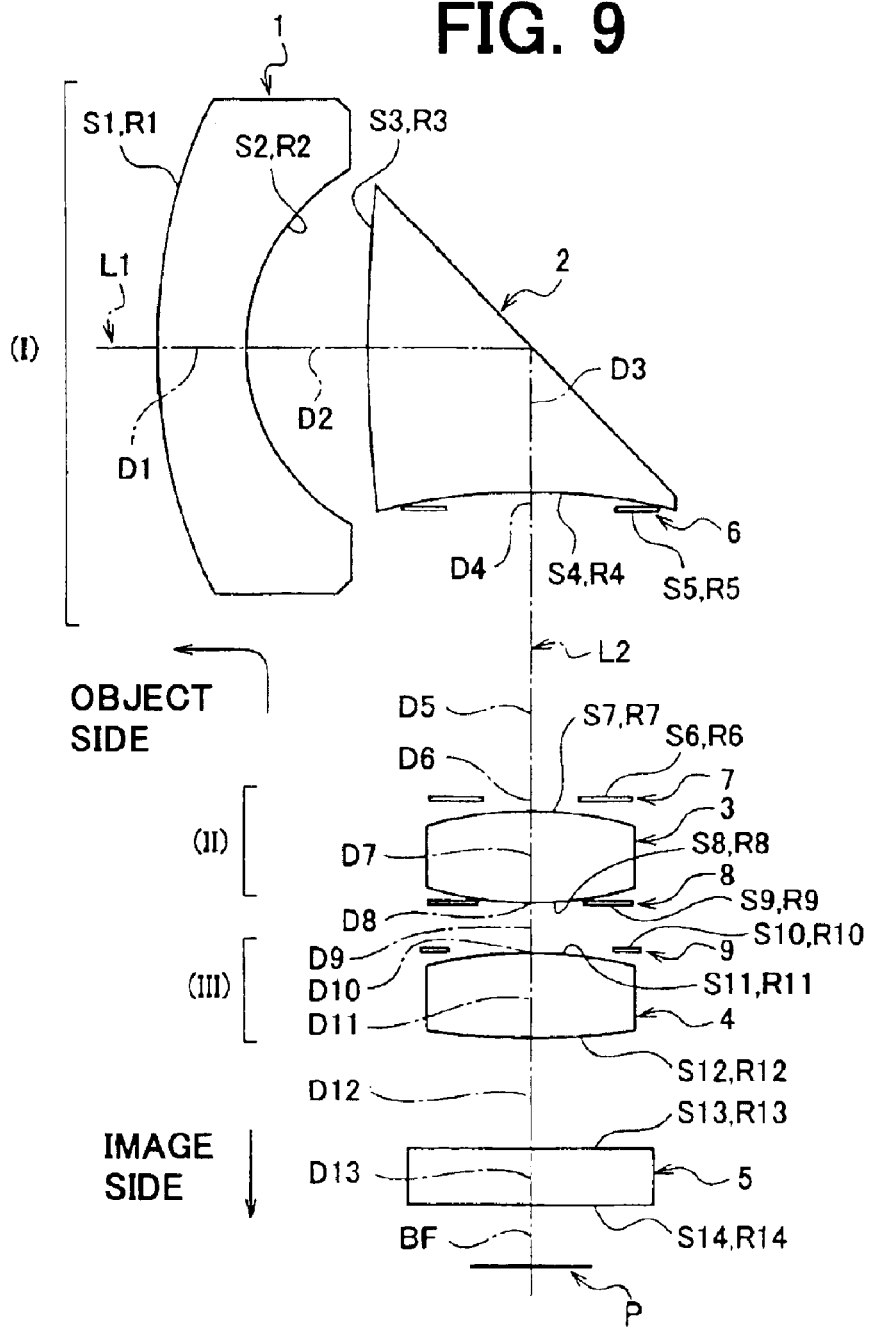

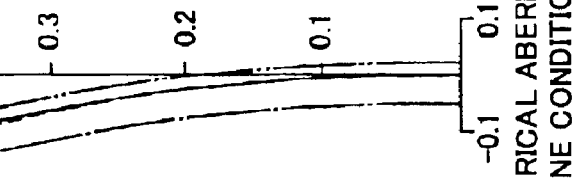

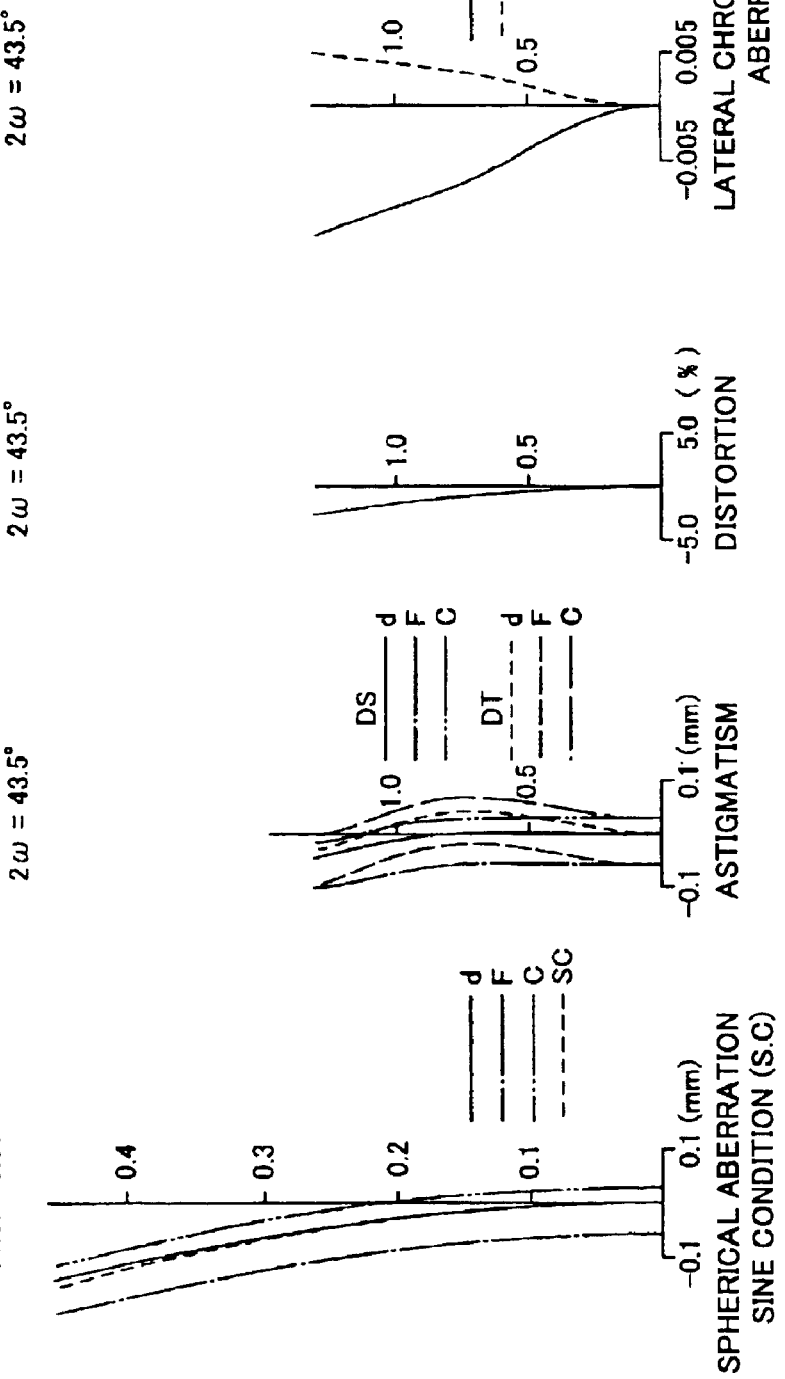

ZOOM LENS

CROSS-REFERENCE TO RELATED APPLICATION

This application claims priority of Japanese Patent Application Number 2003-062782, filed Mar. 10, 2003, which is hereby incorporated by reference in its entirety.

FIELD OF THE INVENTION

The present invention relates to a zoom lens system for cameras such as digital still cameras and video cameras that have image pick up devices, such as a CCD or a CMOS. In particular, the present invention relates to a zoom lens system suitable for cameras such as small digital still cameras and video cameras which are built into devices such as cellular telephones, portable information terminals or personal digital assistants (PDAs).

BACKGROUND OF THE INVENTION

In recent years, due to remarkable technical proceedings in solid state image pickup devices for use in cameras such as digital still cameras and video cameras, small charge-coupled devices ("CCD") and similar devices have been developed. In addition, the small and light optical systems are in demand. In particular, there is a need for smaller and thinner optical systems to be used in cellular telephones and portable information terminals, since these devices are required to be smaller and thinner.

On the other hand, as an optical system used in the conventional cellular telephones and portable information terminals, a single focus lens which has a small and thin configuration is known. The length of the optical system is short and the volume is not so large. For example, this type of conventional optical system is disclosed in Japanese Patent Application Laid-open No. Hei-11-069214 and Japanese Patent Application Laid-open No. 2002-290523.

Further, an optical system changing the direction of incident object light perpendicularly is known by arranging the prism at the most object side in the optical system. For example, this type of conventional optical system is disclosed in Japanese Patent Application Laid-open No. Hei-9-211287.

The demands of the market and the marked advances in IT technology require an optical system (zoom lens) which can take a image not with a single focus lens but with a power variation lens from the short-focal end to the long-focal end, depending on the imaging object. In addition, the optical system can be used in small and thin devices such as cellular telephones and personal digital assistants (PDAs).

However, even in a conventional lens system with a prism, the distance from an incident object to the imaging element is long, since many lenses are employed at the imaging side of the prism, thus no preferable zoom lens has been obtained for such devices as cellular telephones, personal digital assistants, and mobile personal computers, which have a small size and short total length and are easy to fit in a space with small depth and restricted width.

The present invention has been made to solve these problems, and the object of the present invention is to provide a lens system with fewer lenses, a small and thin size and light weight. Furthermore, the lens system of the present invention has high quality optical characteristics and is applicable for devices such as a cellular telephone and mobile information terminal.

SUMMARY OF THE INVENTION

The zoom lens of present invention includes: a first lens group having a negative refractive power as a whole, a second lens group having a positive refractive power as a whole, and a third lens group having a positive refractive power as a whole, arranged in order from an object side to an image side, for zooming from a short-focus end to a long-focus end as well as for correcting image plane changes required in accordance with the zooming by means of moving the second lens group and the third lens group; wherein the first lens group includes a first lens having a negative refractive power and a prism having a negative refractive power for changing a incident light path, arranged in order from the object side to the image side, the second lens group includes a single second lens, the third lens group includes a single third lens.

Since the configuration of this embodiment allows the second lens group and the third lens group to move relatively to each other in the direction of optical axis, correction is made for fluctuation of an image surface. Further, the depth of the zoom lens, which is a dimension for the direction of incoming object light (subject light) to the first lens (single lens and prism), is equal whether or not a picture is being taken. Moreover, since the second and third lens groups located in the image side of the prism are configured as single lenses, a total length of the lens system is short and the lens system has small volume.

In the above embodiment, it is possible to adopt such an embodiment wherein the first lens has an aspherical surface. In this embodiment, better optical characteristics are achieved, such as by correcting distortion.

In the above embodiment, it is possible to adopt such an embodiment wherein the first lens has an aspherical surface formed on a surface of a side with a smaller curvature radius. This embodiment corrects distortion effectively.

In the above embodiment, it is possible to adopt such an embodiment wherein the third lens has aspherical surfaces on both sides. In this embodiment, better correction for spherical aberration is achieved and the length of the total lens system is reduced.

In the above embodiment, it is possible to adopt such an embodiment wherein the third lens is formed by a resin material. In this embodiment, the lens production is easy and results in low cost and the weight of the lens is reduced.

In the above embodiment, it is possible to adopt an embodiment that satisfies following conditional formulas (1) and (2):

$$0.8 < |f1/f2| < 1.5, \quad (1)$$

$$v1 > 40, \quad (2)$$

where f1 is the focal length of the first lens group, f2 is the focal length of the second lens group and v1 is Abbe number of the first lens. According to this embodiment, correction is achieved for distortion, astigmatism and lateral chromatic aberration.

In the above embodiment, it is possible to adopt an embodiment that satisfies following conditional formula (3):

$$0.2 < |fw/f1| < 0.4, \quad (3)$$

where f1 is the focal length of the first lens group and fw is the focal length of the total lens system at the short-focal end.

According to this embodiment, a good correction is achieved for distortion, and astigmatism and the like.

Moreover, the radius of first lens is reduced, since the outer most beam approaches an optical axis at the short-focal end. From this reason, the zoom lens can be miniaturized.

In the above described zoom lens according with the present invention, a suitable zoom lens is obtained for a mobile cellular phone or a mobile information terminal having a size which is smaller and thinner and which has a light weight and low production cost. Especially, the total lens system length is equal or less than 22 mm whether or not in a photographic state (a photo is being taken), and a high quality zoom lens having more smaller and thinner dimension is achieved with well corrected aberrations.

BRIEF DESCRIPTION OF THE DRAWINGS

FIG. 2A, 2B, 2C, and 2D show aberration charts of spherical aberration, astigmatism, distortion, and lateral chromatic aberration at the short-focal end of the zoom lens according to the embodiment of FIG. 1;

FIG. 3A, 3B, 3C, and 3D show aberration charts of spherical aberration, astigmatism, distortion, and lateral chromatic aberration at the middle position of the zoom lens according to the embodiment of FIG. 1;

FIG. 4A, 4B, 4C, and 4D show aberration charts of spherical aberration, astigmatism, distortion, and lateral chromatic aberration at the long-focal end of the zoom lens according to the embodiment of FIG. 1;

FIG. 6A, 6B, 6C, and 6D show aberration charts of spherical aberration, astigmatism, distortion, and lateral chromatic aberration at the short-focal end of the zoom lens according to the embodiment of FIG. 5;

FIG. 7A, 7B, 7C, and 7D show aberration charts of spherical aberration, astigmatism, distortion, and lateral chromatic aberration at the middle position of the zoom lens according to the embodiment of FIG. 5;

FIG. 8A, 8B, 8C, and 8D show aberration charts of spherical aberration, astigmatism, distortion, and lateral chromatic aberration at the long-focal end of the zoom lens according to the embodiment of FIG. 5;

FIG. 9 is a drawing showing a further embodiment of a zoom lens according to the present invention;

FIG. 10A, 10B, 10C, and 10D show aberration charts of spherical aberration, astigmatism, distortion, and lateral chromatic aberration at the short-focal end of the zoom lens according to the embodiment of FIG. 9;

FIG. 11A, 11B, 11C, and 11D show aberration charts of spherical aberration, astigmatism, distortion, and lateral chromatic aberration at the middle position of the zoom lens according to the embodiment of FIG. 9.

DESCRIPTION OF NUMERICAL INDEXES

| I | First lens group |
|---|---|
| II | Second lens group |
| III | Third lens group |

-continued

| 1 | First lens (First lens group) |
|---|---|
| 2 | Prism (First lens group) |
| 3 | Second lens (Second lens group) |
| 4 | Third lens (Third lens group) |
| 5 | Glass filter |
| 6, 7, 8, 9 | Open aperture |
| D1 to D3 | Surfaces distance on an optical axis |
| P | Image plane |
| R1 to R14 | Curvature radius |
| S1 to S14 | Surface |
| BF | Back focus |

DETAILED DESCRIPTION OF THE INVENTION

Figure 1:
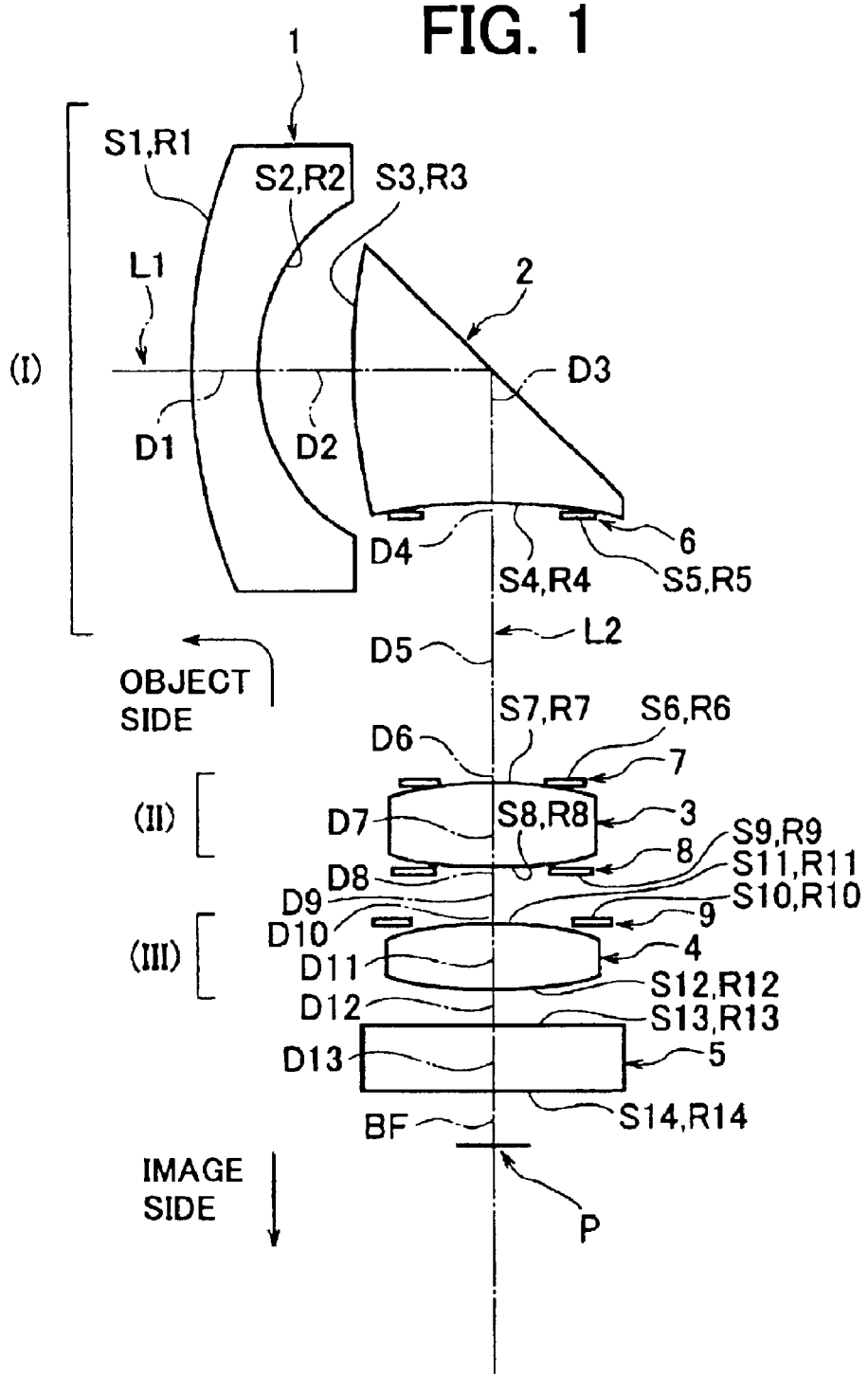
FIG. 1 is a drawing showing an embodiment of a zoom lens according to the present invention.

An embodiment of the present invention is described below referring to the accompanying drawings. FIG. 1 shows a first embodiment of a zoom lens according to the present invention. In this zoom lens, a first lens group (I) that has a negative refractive power as a whole, a second lens group (II) that has positive refractive power as a whole and a third lens group (III) that has positive refractive power as a whole are laid out in that order from the object side to the image plane side along with optical axis direction L1 and L2 as shown in FIG. 1.

The first lens group (I) includes a single first lens 1 that has a negative refractive power, a prism 2 that changes an incident light path and having negative refractive power. The second lens group (II) includes a second lens 3 that has positive refractive power. The third lens group (III) includes a single third lens 4 that has positive refractive power. These lens groups are laid out in this order from object side to image plane side. Further, the first lens 1, prism 2 and third lens 4 are composed of a resin material and the second lens 3 is composed of a glass or a resin material. These lenses composed of a resin material are produced with light weight and low cost.

In the above embodiment, glass filter 5 such as infrared light cutting filter, low pass filter is laid out at the image side of third lens 4 of third lens group (III), and image plane P such as CCD is laid out at the image side of the glass filter. Further, in the first lens group (I), aperture stop 6 is provided at the image side of prism 2. In the second lens group (II), aperture stop 7 and 8 are provided at the object side and image side of the second lens 3 respectively, in here, aperture stop 8 is can be omitted. In the third lens group (III), aperture stop 9 is provided at the object side of the third lens 4. In this configuration, aperture stop 7 and 8 move with the second lens group (II), and aperture stop 9 moves with the third lens group (III).

The aperture stop 6 is effective for correcting a lateral chromatic aberration at the short-focal end around the optical axis. The aperture stop 7 is for selecting the desired F number appropriately. Aperture stop 8 is effective for correcting coma aberration when it is introduced. The aperture stop 9 is effective for correcting aberrations at the long-focal end.

In the above embodiment, since distance between prism 2 and glass filter 5 (or image plane S) is constant, even the second lens group (II) and the third lens group (III) perform a changing power operation by moving relatively these lens groups each other in the direction along with optical axis L2, further each lens group is composed of a single lens that is the second lens 3 and the third lens 4 respectively. It can be easily mounted on such as cellular telephones or mobile information terminals that have restricted space for components in the direction of optical axis L2.

The focal distance of the first lens group (I) is denoted as f1, the focal distance of the second lens group (II) is denoted as f2, the focal distance of the total lens system at the short-focal end is denoted as fw, the focal distance of the total lens system at the long-focal end is denoted as ft and the focal distance of the total lens system at the middle position is denoted as fm.

The surface of first lens 1, prism 2, aperture stop 6, aperture stop 7, second lens 3, aperture stop 8, aperture stop 9, third lens 4 and glass filter 5 are denoted as Si (i=1 to 14), the radius of curvature of each surface Si is Ri (i=1 to 14), the refractive indexes relative to line "d" for first lens 1, prism 2, second lens 3, third lens 4 and glass filter 5 are Ni, and Abbe number is vi (i=1 to 5) as shown in FIG. 1. In addition, the distance (each thickness and distance in the air) in the optical direction of L1 and L2 is denoted as Di (i=1 to 13), back focus length from glass filter 5 to image plane P is shown as BF.

In the first lens group (I), first lens 1 has meniscus shape lens which image plane side surface S2 has a concave shape and object side surface S1 has a convex shape. Further, object side surface S3 of prism 2 forms a convex shape and image plane side surface S4 of prism 2 forms a concave surface, so that the prism 2 has a negative refractive power. Since incident optical axis L1 of object light changes the direction to L2 which is orthogonal to L1 by prism 2, depth of the first lens group (I) that is length in the incident optical axis direction of L1 for zooming can be reduced, thus making the unit thinner.

In the above described embodiment, first lens 1 can be formed with an aspherical surface S2 which faces the image plane and has a smaller curvature radius. This configuration enables to correct distortion especially well, as well as other aberrations. Moreover, when the aspherical surface S2 is formed in such way that negative refractive power weakens toward the periphery, further corrections for distortion and other aberrations are performed.

In the second lens group (II), second lens 3 is a convex lens which has both convex surfaces S6 and S7, disposed in object side and image plane side respectively, such that having positive refractive power as a whole. Objective side surface S6 can be formed as an aspherical surface. This structure is effective for especially well correcting spherical aberration, as well as other aberrations.

In the third lens group (III), third lens 4 is a convex lens which has both convex surfaces S11 and S12, disposed in object side and image plane side respectively, such that having positive refractive power as a whole. In this configuration, both surfaces of S11 and S12 are formed as aspherical surfaces. This configuration achieves especially well correction for spherical aberration, astigmatic aberration and coma aberration, further shorten the total lens length along with optical axis L2.

Aspherical surfaces for first lens 1, second lens 3 and third lens 4 can be expressed as following formula:

$$Z=Cy^2/[1+(1-\epsilon C^2 y^2)^{1/2}]+Dy^4+Ey^6+Fy^8+Gy^{10}+Hy^{12}$$

where Z is the distance from the tangential plane at the vertex of the aspherical surface to a point of the aspherical surface whose height from the optical axis is y; y is a height from the optical axis L (L1, L2), C is the ratio of curvature (1/R) at the vertex of the aspherical surface, $\epsilon$ is the conical constant, and D, E, F, G and H are aspherical coefficients.

In the above embodiment, the focal length f1 of first lens group (I) and the focal length f2 of second lens group (II) are formed to satisfy the following formula (1), the Abbe number v1 of first lens 1 is formed to satisfy the following formula (2) and the focal length fw for total lens system at the short focal end and the focal length f1 for first lens group are formed to satisfy the following formula (3):

$$0.8<|f1/f2|<1.5, \quad (1)$$

$$v1>40, \quad (2)$$

$$0.2<|fw/f1|<0.4. \quad (3)$$

The conditional formula (1) defines the ratio of an appropriate focal length between the first lens group (I) and the second lens group (II), where if the value |f1/f2| exceeds the upper limit, it becomes difficult to correct lateral chromatic aberration, if the value |f1/f2| is less than lower limit, it becomes difficult to obtain satisfactory optical capability, since it is hard to correct distortion and astigmatic aberration. Therefore, it is possible to achieve a satisfactory optical capability by correcting aberrations and reduce the size of the unit by satisfying this conditional formula (1).

The conditional formula (2) relates to correction of lateral chromatic aberration. By satisfying this conditional formula (2), it is possible to correct satisfactory lateral chromatic aberration.

The conditional formula (3) defines the appropriate ratio between total lens system and first lens group at the short-focal end, where if the value |fw/f1| exceeds the upper limit, it is hard to correct distortion and astigmatic aberration; and if the value fw/f1| is less than the lower limit, it is difficult to reduce the size of the unit by diameter of first lens 1 getting larger, since angle between the optical axis and the outer most beam is getting large at short-focal end. Therefore, it is possible to achieve a satisfactory correct distortion, astigmatic aberration and other aberrations by satisfying this conditional formula (3). Further, reducing the size of zoom lens unit and the first lens is achieved.

As an example using specific numerical values of the above embodiment, an embodiment will be shown below. Table 1 shows the major dimensions of an embodiment of the zoom lens of FIG. 1, Table 2 shows various numerical data (setup values), Table 3 shows numerical values of the aspheric surfaces, Table 4 shows the focal length of the total lens system with a character "f" (short-focal end fw, middle position fm, and long-focal end ft) and on-axial surface separation (D5, D9 and D12). In this example, second lens 3 is composed of glass material, surface S7 facing to object side has no aspherical surface and opening aperture 8 is attached. In addition, the numerical data of conditional formulas (1), (2) and (3) are:

$$|f1/f2|=1.275,$$

$$v1=56.4,$$

and $$|fw/f1|=0.33.$$

FIG. 2, FIG. 3 and FIG. 4 are the aberration charts of spherical aberration, astigmatic aberration, distortion, and lateral chromatic aberration respectively. In FIG. 2 through FIG. 4, FIG. 6 through FIG. 8 and FIG. 10 through FIG. 12, the character "d" denotes the aberration due to "d" line, "F" denotes the aberration due to "F" line, and "C" denotes the aberration due to "C" line, while SC denotes the amount of dissatisfaction of the sine condition, DS denotes the aberration on the sagittal plane, and DT denotes the aberration of the meridional plane.

TABLE 1

| | | | |
|---|---|---|---|
| Object Distance (mm) | 600.0 | Total Lens Length From Front Of First Lens 1 To Image Plane (mm) | 21.48 ~21.48 ~21.48 |
| Focal Length (mm) | 2.47 ~3.72 ~4.76 | Back Focus (Air Conversion) (mm) | 3.62 ~2.99 ~2.51 |
| F Number | 2.90 ~3.68 ~4.21 | Angle of view (2ω) | 68.4° ~45.0° ~35.1° |
| Exit Pupil Location (mm) | −7.23 ~−16.39 ~−31.42 | Focal Length f1 (mm) | −7.471 |
| Exit Angle Of Most Outside Ray | −10.91° ~−7.82° ~−6.16 | Focal Length f2 (mm) | 5.859 |
| Total Lens Length From Front Of First Lens 1 To Back Of Third Lens 4 (mm) | 17.44 ~18.26 ~18.57 | | |

TABLE 2

| Surface | Radius of Curvature (mm) | | Distance (mm) | Refractive Index (d line) | | Abbe Number |
|---|---|---|---|---|---|---|
| S1 | R1 | 9.786 | D1 1.25 | N1 | 1.50914 v1 | 56.4 |
| S2* | R2 | 3.126 | | | | |
| | | | D2 1.85 | | | |
| S3 | R3 | 14.452 | D3 5.22 | N2 | 1.50914 v2 | 56.4 |
| S4 | R4 | 9.880 | | | | |
| | | | D4 0.20 | | | |
| S5 | R5 | ∞ (infinity) Aperture Stop | | | | |
| | | | D5 (variable) | | | |
| S6 | R6 | ∞ (infinity) Aperture Stop | | | | |
| | | | D6 0.00 | | | |
| S7 | R7 | 6.120 | D7 1.60 | N3 | 1.63854 v3 | 55.5 |
| S8 | R8 | −8.645 | | | | |
| | | | D8 0.00 | | | |
| S9 | R9 | ∞ (infinity) Aperture Stop | | | | |
| | | | D9 (variable) | | | |
| S10 | R10 | ∞ (infinity) Aperture Stop | | | | |
| | | | D10 0.00 | | | |
| S11* | R11 | 7.664 | D11 1.20 | N4 | 1.50914 v4 | 56.4 |
| S12* | R12 | −13.434 | | | | |
| | | | D12 (variable) | | | |
| S13 | R13 | ∞ (infinity) | D13 1.20 | N5 | 1.51680 v5 | 64.2 |
| S14 | R14 | ∞ (infinity) | | | | |
| | | | BF 1.00 | | | |

*Aspherical Surface

TABLE 3

| | Aspheric Coefficient | Numerical Data |
|---|---|---|
| S2 Surface | ε | 0.6818252 |
| | D | $0.4459738 \times 10^{-3}$ |
| | E | $-0.2997761 \times 10^{-4}$ |
| | F | $0.1056667 \times 10^{-4}$ |
| | G | $-0.6845855 \times 10^{-6}$ |
| | H | 0.0000000 |
| S11 | ε | 4.1598439 |

TABLE 3-continued

| | Aspheric Coefficient | Numerical Data |
|---|---|---|
| Surface | D | $0.1051034 \times 10^{-3}$ |
| | E | $0.2038691 \times 10^{-4}$ |
| | F | $0.1329260 \times 10^{-5}$ |
| | G | $0.1077672 \times 10^{-6}$ |
| | H | 0.0000000 |
| S12 Surface | ε | −105.0000 |
| | D | $0.2045692 \times 10^{-3}$ |
| | E | $0.2943509 \times 10^{-3}$ |
| | F | $0.7675596 \times 10^{-6}$ |
| | G | $0.9345067 \times 10^{-7}$ |
| | H | 0.0000000 |

TABLE 4

| | Short Focal End | Middle Position | Long Focal End |
|---|---|---|---|
| f (mm) | 2.47 (fw) | 3.72 (fm) | 4.76 (ft) |
| D5 (mm) | 5.122 | 2.693 | 1.323 |
| D9 (mm) | 1.000 | 4.243 | 5.924 |
| D12 (mm) | 1.834 | 1.020 | 0.709 |

In the above embodiment, total lens system length (the distance from object side surface S1 of first lens 1 to image plane P) is 21.48 mm (constant value), back focus (air conversion) is 3.62 mm (short-focal end) to 2.99 (middle position) to 2.51 (long-focal end), F number is 2.90 (short-focal end) to 3.68 (middle position) to 4.21 (long-focal end), and angle of view (2ω) is 68.4° (short-focal end) to 45.0° (middle position) to 35.1° (long-focal end), thus providing a thin, short, and a high optical capability lens with all aberrations suitably corrected.

Figure 5:
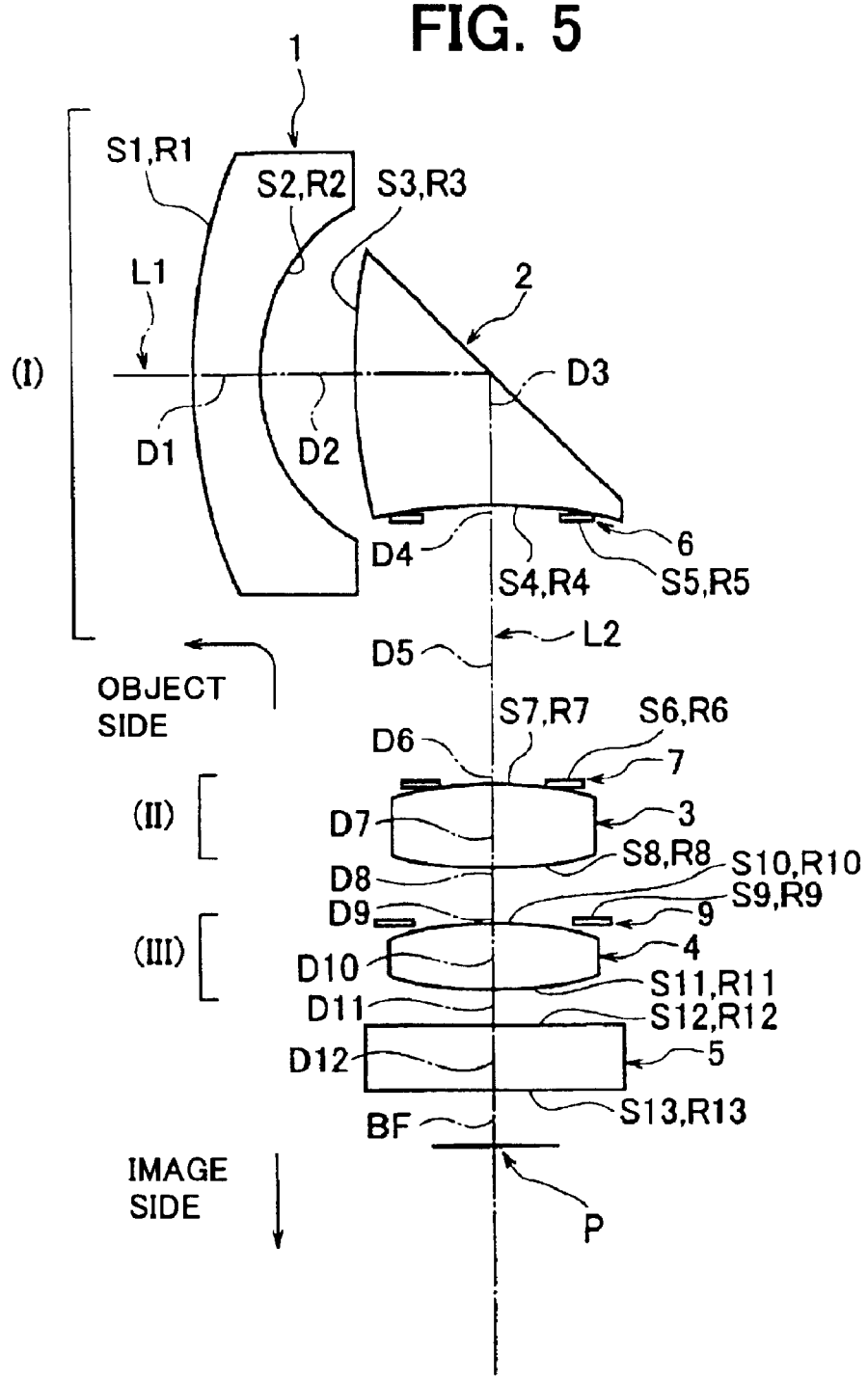
FIG. 5 is a drawing showing another embodiment of a zoom lens according to the present invention.
Figure 12D:
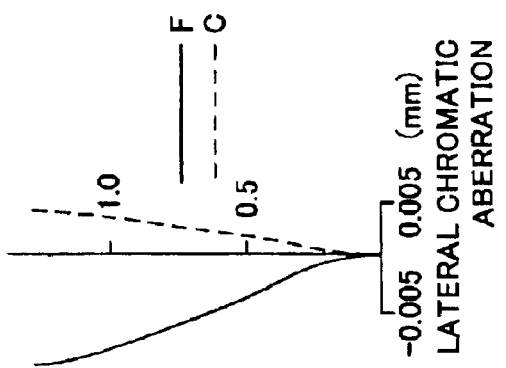
FIG. 12A, 12B, 12C, and 12D show aberration charts of spherical aberration, astigmatism, distortion, and lateral chromatic aberration at the long-focal end of the zoom lens according to the embodiment of FIG. 9.
Figure 12C:
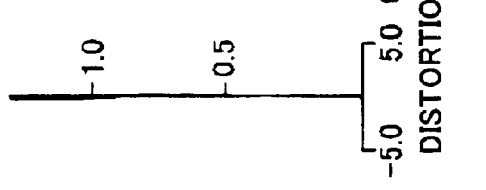
Figure 12B:
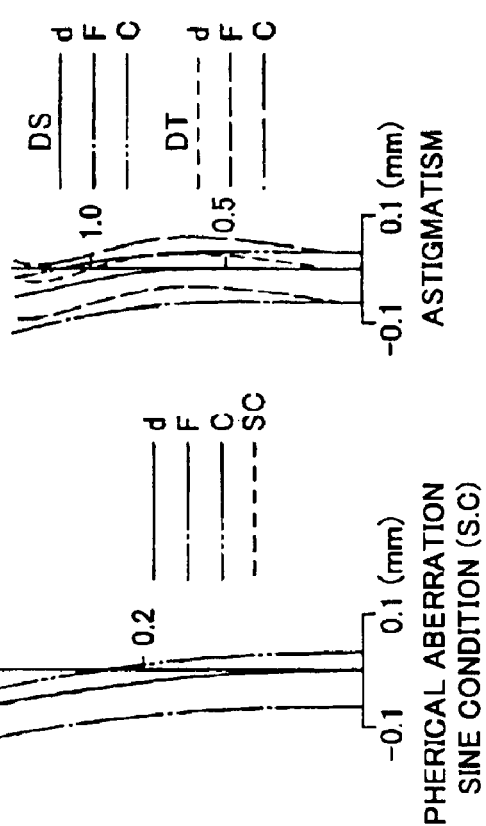
Figure 12A:

FIG. 5 shows basic constitutions of a zoom lens of another embodiment according to this invention. This constitution is same as in the embodiment of FIG. 1 except for employing resin formed lens for second lens 3, surface S7 has an aspherical surface, open aperture 8 is omitted and the numerical data of first lens 1, prism 2, second lens 3 and third lens 4 is changed.

As shown in FIG. 5, for first lens 1, prism 2, open aperture 6, open aperture 7, second lens 3, open aperture 9, third lens 4 and glass filter 5, each surface is denoted as Si (i=1 to 13) and each curvature radius for the Si surfaces is denoted as Ri (i=1 to 13).

As an example using specific numerical values of the above embodiment, an embodiment will be shown below. Table 5 shows a major dimensions of an embodiment of the zoom lens of FIG. 5, Table 6 shows various numerical data (setup values), Table 7 shows a numeric values of the aspheric surfaces, Table 8 shows the focal distance of the total lens system with a character "f" for short-focal end, middle position and long-focal end (short-focal end fw, middle position fm, long-focal end ft) and on axial surface separation D5, D8 and D11. In this example, the numerical data of the conditional formulas (1), (2) and (3) are:

$|f1/f2|=1.206,$ $v1=56.4,$ and $|fw/f1|=0.37.$

FIG. 6, FIG. 7 and FIG. 8 are the aberration charts of spherical aberration, astigmatic aberration, distortion, and lateral chromatic aberration at the short-focal end, middle position and long-focal end.

TABLE 5

| | | | |
|---|---|---|---|
| Object Distance (mm) | 500.0 | Total Lens Length From Front Of First Lens 1 To Image Plane (mm) | 21.67 ~21.67 ~21.67 |
| Focal Length (mm) | 2.49 ~3.74 ~4.75 | Back Focus (Air Conversion) (mm) | 3.92 ~3.59 ~3.65 |
| F Number | 2.87 ~3.57 ~3.98 | Angle of view (2ω) | 68.4° ~45.1° ~35.4° |
| Exit Pupil Location (mm) | −7.82 ~−21.18 ~−57.95 | Focal Length f1 (mm) | −8.066 |
| Exit Angle Of Most Outside Ray | −6.97° ~−5.97° ~−4.28° | Focal Length f2 (mm) | 6.689 |
| Total Lens Length From Front Of First Lens 1 To Back Of Third Lens 4 (mm) | 17.34 ~17.67 ~17.61 | | |

TABLE 6

| Surface | Radius of Curvature (mm) | | Distance (mm) | | Refractive Index (d line) | Abbe Number |
|---|---|---|---|---|---|---|
| S1 | R1 | 9.984 | D1 | 1.25 | N1 1.50914 v1 | 56.4 |
| S2* | R2 | 3.271 | | | | |
| | | | D2 | 1.85 | | |
| S3 | R3 | 16.030 | D3 | 5.22 | N2 1.50914 v2 | 56.4 |
| S4 | R4 | 11.101 | | | | |
| | | | D4 | 0.10 | | |
| S5 | R5 | ∞ (infinity) Aperture Stop | | | | |
| | | | D5 | (variable) | | |
| S6 | R6 | ∞ (infinity) Aperture Stop | | | | |
| | | | D6 | 0.00 | | |
| S7* | R7 | 6.756 | D7 | 1.60 | N3 1.50914 v3 | 56.4 |
| S8 | R8 | −6.318 | | | | |
| | | | D8 | (variable) | | |
| S9 | R9 | ∞ (infinity) Aperture Stop | | | | |
| | | | D9 | 0.00 | | |
| S10* | R10 | 7.412 | D10 | 1.20 | N4 1.50914 v4 | 56.4 |
| S11* | R11 | −8.973 | | | | |
| | | | D11 | (variable) | | |
| S12 | R12 | ∞ (infinity) | D12 | 1.20 | N5 1.51680 v5 | 64.2 |
| S13 | R13 | ∞ (infinity) | | | | |
| | | | BF | 1.00 | | |

*Aspherical Surface

TABLE 7

| Aspheric Coefficient | | Numerical Data |
|---|---|---|
| S2 Surface | ϵ | 0.6408193 |
| | D | $0.5378562 \times 10^{-3}$ |
| | E | $-0.4157615 \times 10^{-4}$ |
| | F | $0.1564847 \times 10^{-4}$ |
| | G | $-0.7562599 \times 10^{-6}$ |
| | H | 0.0000000 |
| S7 Surface | ϵ | −2.4325882 |
| | D | $0.3362041 \times 10^{-3}$ |
| | E | $0.1331683 \times 10^{-3}$ |
| | F | $-0.2554408 \times 10^{-4}$ |
| | G | $0.4363894 \times 10^{-6}$ |
| | H | 0.0000000 |

TABLE 7-continued

| Aspheric Coefficient | | Numerical Data |
|---|---|---|
| S10 Surface | ϵ | 12.485404 |
| | D | $-0.5600831 \times 10^{-2}$ |
| | E | $-0.1623345 \times 10^{-3}$ |
| | F | $-0.7061015 \times 10^{-5}$ |
| | G | $0.1264245 \times 10^{-5}$ |
| | H | 0.0000000 |
| S11 Surface | ϵ | −5.4962016 |
| | D | $0.6513158 \times 10^{-5}$ |
| | E | $-0.5137632 \times 10^{-5}$ |
| | F | $0.3529252 \times 10^{-6}$ |
| | G | $0.2477520 \times 10^{-7}$ |
| | H | 0.0000000 |

TABLE 8

| | Short Focal End | Middle Position | Long Focal End |
|---|---|---|---|
| f (mm) | 2.49 (fw) | 3.74 (fm) | 4.75 (ft) |
| D5 (mm) | 5.222 | 2.441 | 0.827 |
| D9 (mm) | 0.900 | 4.007 | 5.562 |
| D12 (mm) | 2.126 | 1.800 | 1.859 |

In the above embodiment, total lens system length (the distance from object side of first lens 1 to image plane P) is 21.67 mm (constant value), back focus (air conversion) is 3.92 mm (short-focal end) to 3.59 (middle position) to 3.65 (long-focal end), F number is 2.87 (short-focal end) to 3.57 (middle position) to 3.98 (long-focal end), and angle of view (2ω) is 68.4° (short-focal end) to 45.1° (middle position) to 35.4° (long-focal end), thus providing a compact, thin, and a high optical capability lens with all aberrations suitably corrected.

FIG. 9 shows basic constitutions of zoom lens of yet another embodiment according to this invention. This constitution is the same as shown in FIG. 1 except for employing bi-convex lens for second lens 3 having same curvature radius R7 and R8 on surface S7 and surface S8 respectively, moving location of open aperture 7, and changing the numerical data of first lens 1, third lens 4 and prism 2.

An example using specific numerical values of the above embodiment, an embodiment is shown below. Table 9 shows a major dimensions of an embodiment of the zoom lens of FIG. 9, Table 10 shows various numerical data (setup values), Table 11 shows a numeric values of the aspheric surfaces, Table 12 shows the focal distance of the total lens system with a character "f" for short-focal end, middle position and long-focal end (short-focal end fw, middle position fm, long-focal end ft) and on axial surface separation D5, D9 and D12. In this example, the numerical data of the conditional formulas (1), (2) and (3) are:

$|f1/f2|=1.249,$ $v1=56.4,$ and $|fw/f1|=0.312.$

FIG. 10, FIG. 11 and FIG. 12 are the aberration charts of spherical aberration, astigmatic aberration, distortion, and lateral chromatic aberration at the short-focal end, middle position and long-focal end.

TABLE 9

| | | | |
|---|---|---|---|
| Object Distance (mm) | 600.0 | Total Lens Length From Front Of First Lens 1 To Image Plane (mm) | 21.096 ~21.096 ~21.096 |
| Focal Length (mm) | 2.24 ~3.36 ~4.47 | Back Focus (Air Conversion) (mm) | 3.38 ~2.79 ~2.59 |
| F Number | 2.87 ~3.59 ~4.18 | Angle of view (2ω) | 65.5° ~43.5° ~32.5° |
| Exit Pupil Location (mm) | −7.53 ~−19.43 ~−62.46 | Focal Length f1 (mm) | −7.166 |
| Exit Angle Of Most Outside Ray | −9.04° ~−5.07° ~−3.25° | Focal Length f2 (mm) | 5.739 |
| Total Lens Length From Front Of First Lens 1 To Back Of Third Lens 4 (mm) | 17.405 ~17.995 ~18.196 | | |

TABLE 10

| Surface | Radius of Curvature (mm) | | Distance (mm) | | Refractive Index (d line) | | Abbe Number |
|---|---|---|---|---|---|---|---|
| S1 | R1 | 8.500 | D1 | 1.500 | N1 | 1.50914 v1 | 56.4 |
| S2* | R2 | 3.087 | | | | | |
| | | | D2 | 2.00 | | | |
| S3 | R3 | 23.126 | D3 | 5.00 | N2 | 1.50914 v2 | 56.4 |
| S4 | R4 | 10.029 | | | | | |
| | | | D4 | 0.230 | | | |
| S5 | R5 | ∞ (infinity) Aperture Stop | | | | | |
| | | | D5 | (variable) | | | |
| S6 | R6 | ∞ (infinity) Aperture Stop | | | | | |
| | | | D6 | 0.150 | | | |
| S7 | R7 | 5.664 | D7 | 1.500 | N3 | 1.51680 v3 | 64.2 |
| S8 | R8 | −5.664 | | | | | |
| | | | D8 | 0.00 | | | |
| S9 | R9 | ∞ (infinity) Aperture Stop | | | | | |
| | | | D9 | (variable) | | | |
| S10 | R10 | ∞ (infinity) Aperture Stop | | | | | |
| | | | D10 | 0.000 | | | |
| S11* | R11 | 7.233 | D11 | 1.350 | N4 | 1.50914 v4 | 56.4 |
| S12* | R12 | −9.541 | | | | | |
| | | | D12 | (variable) | | | |
| S13 | R13 | ∞ (infinity) | D13 | 0.900 | N5 | 1.51680 v5 | 64.2 |
| S14 | R14 | ∞ (infinity) | | | | | |
| | | | BF | 1.00 | | | |

*Aspheric Surface

TABLE 11

| Aspheric Coefficient | | Numerical Data |
|---|---|---|
| S2 Surface | ε | 0.8370000 |
| | D | $0.5249683 \times 10^{-3}$ |
| | E | $-0.1770215 \times 10^{-3}$ |
| | F | $0.1400820 \times 10^{-4}$ |
| | G | $-0.1039591 \times 10^{-5}$ |
| | H | $-0.5994064 \times 10^{-7}$ |

TABLE 11-continued

| Aspheric Coefficient | | Numerical Data |
|---|---|---|
| S11 Surface | ε | 1.0000000 |
| | D | $0.3389600 \times 10^{-3}$ |
| | E | $0.3182200 \times 10^{-4}$ |
| | F | $0.1964700 \times 10^{-5}$ |
| | G | $0.1662600 \times 10^{-6}$ |
| | H | 0.0000000 |
| S12 Surface | ε | 1.0000000 |
| | D | $0.6454570 \times 10^{-2}$ |
| | E | $-0.2415030 \times 10^{-2}$ |
| | F | $0.4581970 \times 10^{-3}$ |
| | G | $0.7000000 \times 10^{-4}$ |
| | H | 0.0000000 |

TABLE 12

| | Short Focal End | Middle Position | Long Focal End |
|---|---|---|---|
| f (mm) | 2.24 (fw) | 3.36 (fm) | 4.47 (ft) |
| D5 (mm) | 4.825 | 2.455 | 0.850 |
| D9 (mm) | 0.850 | 3.810 | 5.616 |
| D12 (mm) | 1.791 | 1.201 | 1.000 |

In the above embodiment, total lens system length (the distance from object side of first lens 1 to image plane P) is 21.096 mm (constant value), back focus (air conversion) is 3.38 mm (short-focal end) to 2.79 (middle position) to 2.59 (long-focal end), F number is 2.87 (short-focal end) to 3.59 (middle position) to 4.18 (long-focal end), and angle of view (2ω) is 65.5° (short-focal end) to 43.5° (middle position) to 32.5° (long-focal end), thus providing a compact, thin, and a high optical capability lens with aberrations suitably corrected.

In the above described embodiments, the zoom lens relates to the present invention is applicable not only for power variation optical lens system for digital video camera or digital still camera with imaging elements but also especially preferable for devices such as a cellular telephone, mobile type personal computer and personal digital assistance.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising:

a first lens group having a negative refractive power;

a second lens group having a positive refractive power; and a third lens group having a positive refractive power;

wherein said first lens group, said second lens group, and said third lens group are arranged in an order from an object side to an image side;

the zoom lens being capable of zooming from a short-focal end to a long-focal end and correcting image surface changes in accordance with the zooming by means of moving at least one of said second lens group and said third lens group;

said first lens group comprises a first lens having a negative refractive power and a prism having a negative refractive power for changing a incident light path, arranged in order from the object side to the image side, said second lens group comprising a single second lens, and said third lens group comprising a single third lens.

2. The zoom lens claimed in claim 1 wherein said first lens has an aspherical surface.

3. The zoom lens claimed in claim 2 wherein said aspherical surface is formed on a surface on a side of said first lens with a smaller curvature radius.

4. The zoom lens claimed in claim 2 wherein said third lens has aspherical surfaces on both sides.

5. The zoom lens claimed in claim 4 wherein said third lens is formed by a resin material.

6. The zoom lens claimed in claim 1 wherein the zoom lens satisfies equations (1) and (2):

$$0.8<|f1/f2|<1.5, \quad (1)$$

$$v1>40, \quad (2)$$

wherein f1 is a focal length of the first lens group, f2 is a focal length of the second lens group, and v1 is a Abbe number of the first lens.

7. The zoom lens claimed in claim 1 wherein the zoom lens satisfies equation (3):

$$0.2<|fw/f1|<0.4, \quad (3)$$

wherein fw is a focal length of a total lens system at the short focal end, f1 is a focal length of the first lens group, and the total lens system comprises the first lens group, the second lens group, and the third lens group.

8. The zoom lens claimed in claim 2 wherein the zoom lens satisfies equations (1) and (2):

$$0.8<|f1/f2|<1.5, \quad (1)$$

$$v1>40, \quad (2)$$

wherein f1 is a focal length of the first lens group, f2 is a focal length of the second lens group, and v1 is a Abbe number of the first lens.

9. The zoom lens claimed in claim 8 wherein the zoom lens satisfies equation (3):

$$0.2<|fw/f1|<0.4, \quad (3)$$

wherein fw is a focal length of a total lens system at the short focal end and the total lens system comprises the first lens group, the second lens group, and the third lens group.

10. The zoom lens claimed in claim 4 wherein the zoom lens satisfies equations (1) and (2):

$$0.8<|f1/f2|<1.5, \quad (1)$$

$$v1<40, \quad (2)$$

wherein f1 is a focal length of the first lens group, f2 is a focal length of the second lens group, and v1 is a Abbe number of the first lens.

11. The zoom lens claimed in claim 10 wherein the zoom lens satisfies equation (3):

$$0.2<|fw/f1|<0.4, \quad (3)$$

wherein fw is a focal length of a total lens system at the short focal end and the total lens system comprises the first lens group, the second lens group, and the third lens group.

12. The zoom lens claimed in claim 1 wherein said third lens has aspherical surfaces on both sides.

13. The zoom lens claimed in claim 12 wherein said third lens is formed by a resin material.

14. The zomm lens claimed in claim 12 wherein the zoom lens satisfies equations (1) and (2):

$$0.8<|f1/f2|<1.5, \quad (1)$$

$$v1<40, \quad (2)$$

wherein f1 is a focal length of the first lens group, f2 is a focal length of the second lens group, and v1 is a Abbe number of the first lens.

15. The zoom lens claimed in claim 14 wherein the zoom lens satisfies equation (3):

$$0.2<|fw/f1|<0.4, \quad (3)$$

wherein fw is a focal length of a total lens system at the short focal end and the total lens system comprises the first lens group, the second lens group, and the third lens group.

* * * * *